Patented Oct. 15, 1935

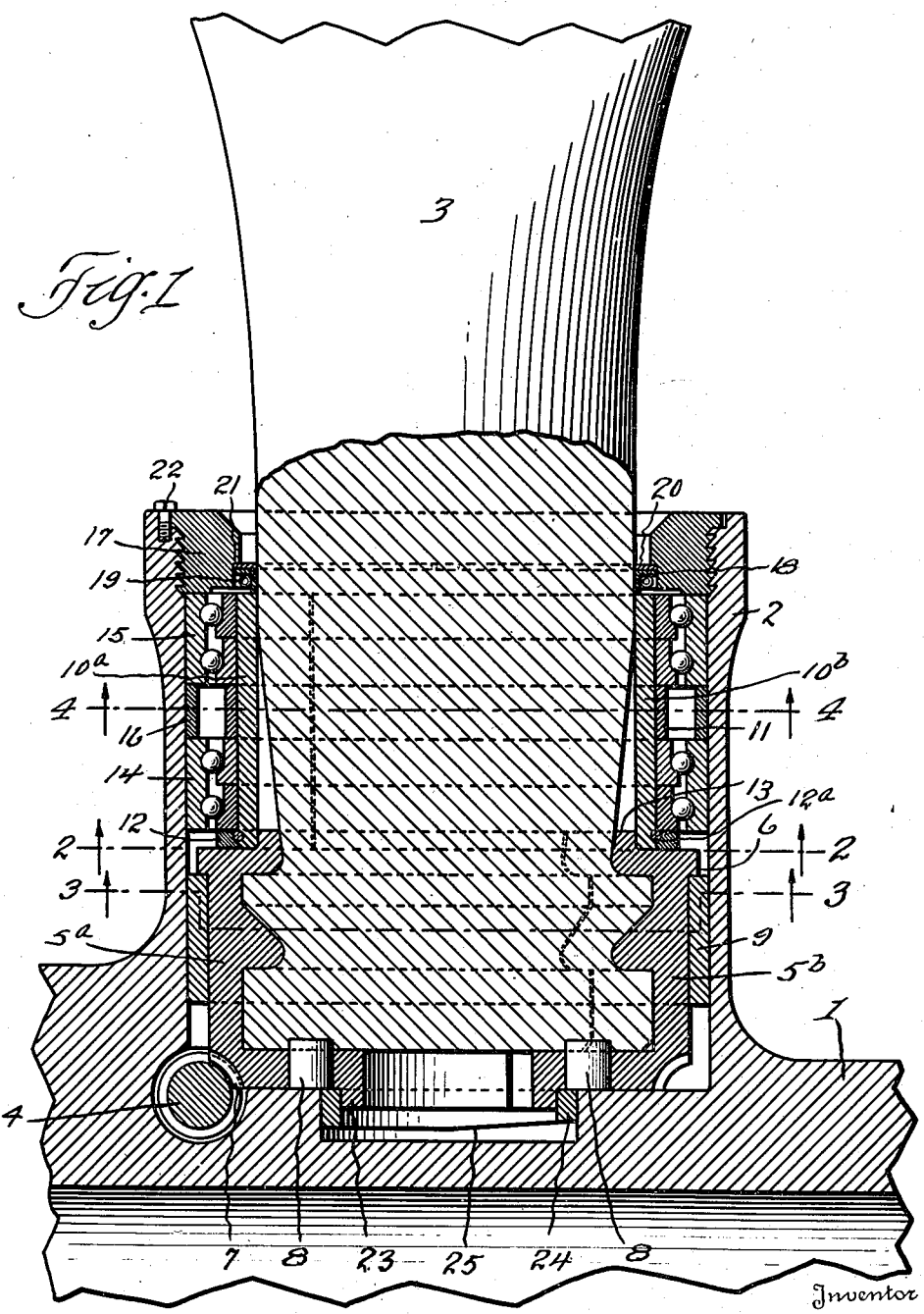

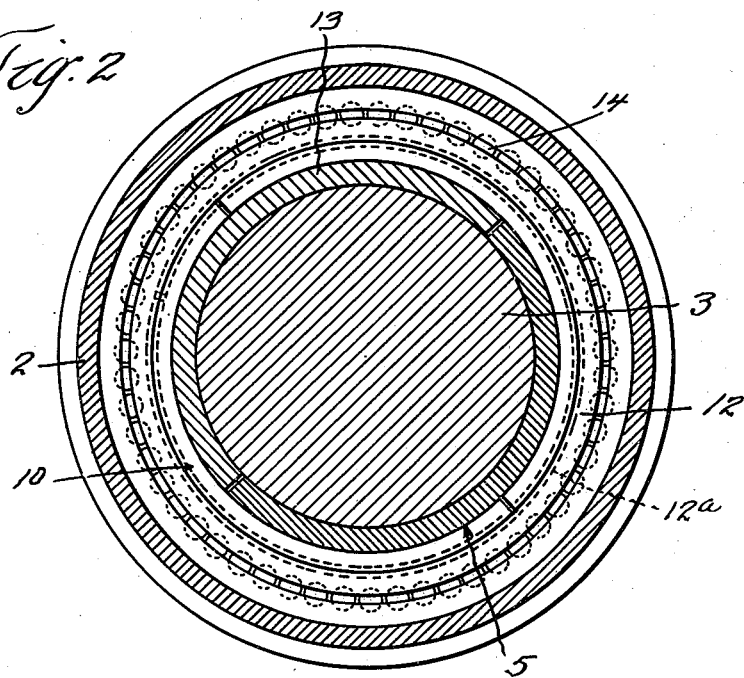
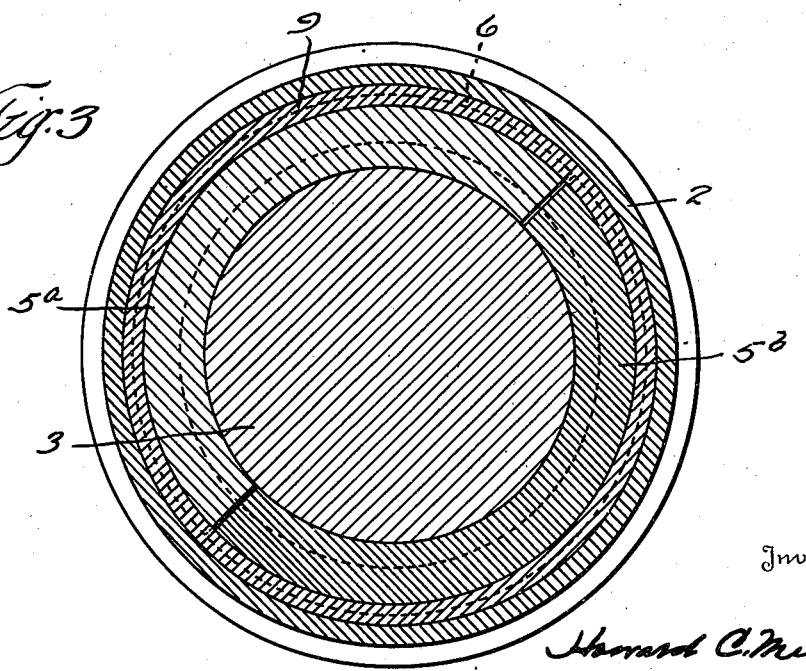

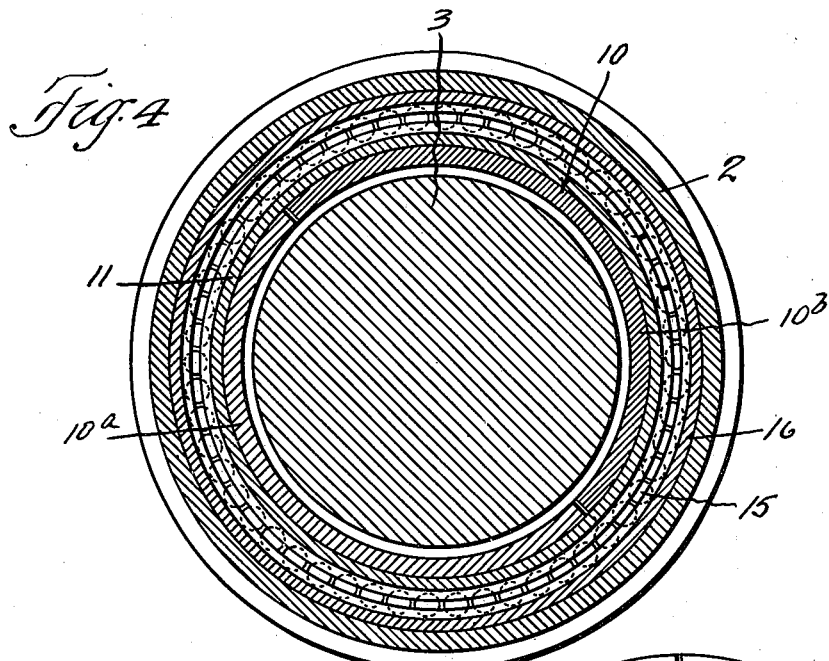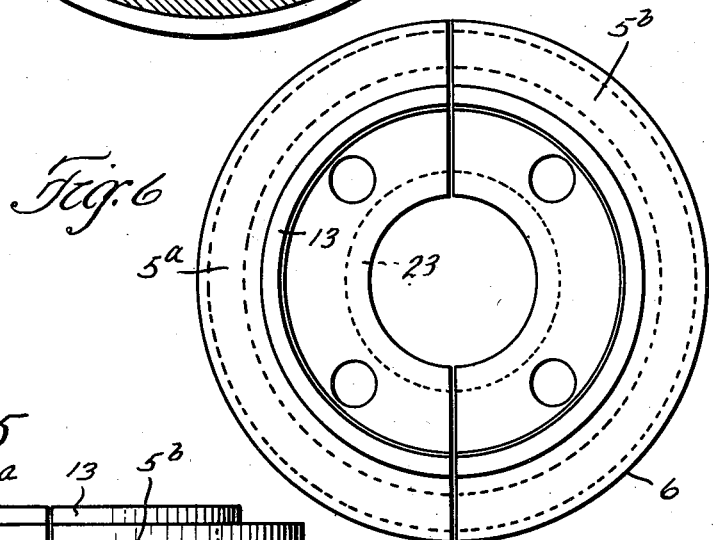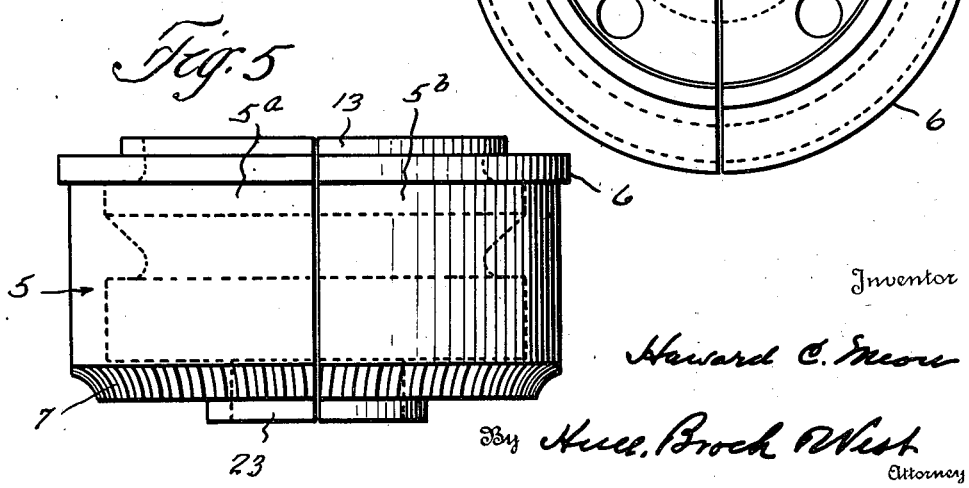

2,017,505

UNITED STATES PATENT OFFICE 2,017,505

PROPELLER BLADE MOUNTING FOR VARIABLE PITCH PROPELLERS

Howard C. Meon, Cleveland, Ohio, assignor to Meon Engineering Corporation, New York, N. Y., a corporation of Delaware Application February 15, 1933, Serial No. 656,865

9 Claims. (Cl. 170—173)

This invention relates generally to airplane propellers and more particularly to a propeller blade mounting for variable pitch propellers of the type having a hub in which two or more propeller blades are removably secured.

One of the objects of the invention is to provide a hub which is adapted to receive therein propeller blades of standard size and construction and which is provided with simple and effective means for securing the blade in place.

My improved propeller blade mounting and hub construction is particularly designed for use on an airplane having mechanism operated from the airplane motor for changing the pitch of the propeller blade and means are provided for firmly and rigidly securing the blade against endwise displacement.

Another object of the invention is to provide a propeller blade mounting and hub construction which is simple in construction and comprises comparatively few parts which are adapted for production at relatively low cost.

Another object of the invention is to provide a propeller blade mounting of the character described which can be assembled or disassembled with a minimum amount of effort and adjustment.

Further and more limited objects of the invention will appear as the description proceeds and by reference to the accompanying drawings in which Fig. 1 is a fragmentary view partly in section and partly in elevation showing my improved propeller blade mounting and hub construction; Fig. 2 is a sectional view on the line 2—2 of Fig. 1; Fig. 3 is a sectional view on the line 3—3 of Fig. 1; Fig. 4 is a sectional view on the line 4—4 of Fig. 1; Fig. 5 is a view in front elevation of the end bearing member and Fig. 6 is a bottom plan view of the bearing member shown in Fig. 5.

Referring now to the drawings, the reference character 1 designates the body of the hub which is adapted to be secured to the shaft of the airplane motor and which is provided with two or more radially disposed projections 2 which are recessed to receive the propeller blade 3 therein. Journaled in the hub are a plurality of worm wheels 4 (only one of which is shown) which are journaled in suitable bearings (not shown). It is of course to be understood that the hub is designed to receive two, three or more blades therein. The propeller blade 3 is made of aluminum and is of standard construction and is shaped in section as shown most clearly in Fig. 1. The inner end of the blade is received in the hollow projection 2 in the position shown in Fig. 1. Secured over the inner end of the propeller blade is an end bearing member 5 which is made up of semi-circular sections 5ª and 5ᵇ and is provided with an overhanging peripheral flange or shoulder 6. Preferably formed upon the inner end of the semi-circular sections 5ª and 5ᵇ is a gear 7 which is adapted to mesh with and be driven by the worm 4. This end bearing member 5 is non-rotatably secured to the end of the blade by means of dowel pins 8. The two semi-circular portions 5ª and 5ᵇ are secured over the inner end of the blade and are held in place by means of a ring 9 which abuts the overhanging flange or shoulder 6 and serves also to provide a bearing for the blade. Also surrounding the blade 3 is the bearing sleeve 10 which is made up of two semi-circular portions 10ª and 10ᵇ which are held in place by a ring member 11. Surrounding the inner end of the sleeve 10 is a ring member 12 which is made in one piece and which is locked against axial movement with respect to the sleeve 10 by means of a split locking ring 12ª which engages complementary grooves provided in the sleeve 10 and ring member 12. This ring member 12 holds the sleeve 10 against endwise movement as a result of the centrifugal force produced by the rotation of the hub. The ring member 12 however is readily removable to permit the bearings to be inserted over the sleeve 10. The end bearing member 5 is provided with an annular upstanding neck portion 13 which fits within the lower end of the sleeve 10 in the position shown in Fig. 1.

Fitting within the recess provided in the projection 2 are a pair of bearings 14 and 15 which are held in spaced relation by means of a ring 16. The parts are secured in place by means of an annular nut 17 which threadedly engages the interior of the projection 2 and bears against the upper bearing 15. Surrounding the blade is a cup-leather 18 which is surrounded by a coil spring 19. The cup-leather is held in place by means of a diametrically split ring 20 which engages under the overhanging shoulder 21 provided on the interior of the nut 17. When the nut 17 has been tightened, it is secured in place by means of one or more locking screws or pins 22.

The worm 4 is adapted to be operatively connected with the airplane motor and has a driving connection with the blade through the medium of the gear 7 so that the pitch of the blade may be varied in either direction. Particular attention is directed to the fact that all of the parts forming the mounting for the blade may be secured thereon before the blade is inserted into the hub. The blade and its associated parts are firmly held in place by the nut 17 which when tightened urges the gear 7 into engagement with the worm 4 so as to form a driving connection therebetween. The recess in the projection 2 is adapted to be filled with a suitable lubricant through suitable connections not illustrated. The inner end of the end bearing member 5 is provided with a downwardly extending flange or shoulder 23 over which is press fitted a ring member 24 which is provided with a cam surface 25 which is adapted to cooperate with suitable means (not shown) for limiting the pitch variation.

In assembling the parts, the locking nut 17, split ring 20, cup leather 18 and spring 19 are first secured over the end of the blade. The sleeve sections 10$^a$ and 10$^b$ are then put in place and the bearing 15, rings 16 and 11 and bearing 14 slipped thereover. The ring 12 is then slipped over the end of the sleeve and locked thereto by means of the split locking ring 12$^a$ which engages in a groove provided in the sleeve. The sections 5$^a$ and 5$^b$ of the end bearing member 5 are then put in place and secured to the blade by means of the bearing ring 9. The sections 5$^a$ and 5$^b$ are further secured to the blade by means of the dowel pins 8. It will thus be seen that all of the parts are secured to the blade and locked in place and the blade then inserted into the recessed projection 2. The nut 17 is then tightened to firmly secure the parts in place within the hub. The gear 7 formed on the inner end of the end bearing member 5 engages the worm 4 and forms a driving connection therewith by means of which the movement may be imparted to the blade. It is of course understood that each hub receives two or more blades which are identical and which are adjusted in the same manner.

It will now be clear that I have provided a propeller blade mounting and hub construction for variable pitch propellers for airplanes which will accomplish the objects of the invention as hereinbefore stated. Various changes may be made in the shape, size and arrangement of parts without departing from the spirit of my invention. It is therefore to be understood that the embodiment of the invention herein disclosed is merely illustrative and is not to be considered in a limiting sense as the invention is limited only in accordance with the scope of the appended claims.

Having thus described my invention, what I claim is:

1. A propeller blade mounting for variable pitch propellers comprising a hub having a recess adapted to receive the end of the propeller blade therein, an end bearing member non-rotatably secured to the inner end of said blade and being split diametrically, a ring securing said bearing member to said blade, a split sleeve surrounding said blade and abutting said end bearing member, a pair of ring members surrounding said split sleeve and a nut surrounding said blade and engaging said hub and securing the blade and associated parts in place, and a gear carried by said end bearing member adapted to engage and mesh with a worm carried by said hub.

2. A propeller blade mounting for variable pitch propellers comprising a hub having a plurality of recesses therein adapted to receive the ends of the propeller blades therein, an end bearing member secured to the inner end of each of said blades, a split sleeve surrounding each of said blades and abutting said end bearing member, a plurality of bearings surrounding each of said split sleeves, a nut surrounding said blade and securing the blade and its associated parts in place, a worm journaled in said hub, the inner end of said end bearing member being shaped to form a driving connection with said worm.

3. In a propeller blade mounting for variable pitch propellers, the combination of a hub having a recess therein adapted to receive the end of a propeller blade, an end bearing member surrounding the inner end of said blade and being split diametrically, and means surrounding said end bearing member and securing the same to said blade independent of said hub.

4. In a propeller blade mounting for variable pitch propellers, the combination of a hub having a recess therein adapted to receive the end of a propeller blade, an end bearing member surrounding the inner end of said blade and being split diametrically, and means securing said end bearing member to said blade independent of said hub, a split sleeve surrounding said blade and abutting said end bearing member, a plurality of bearings surrounding said split sleeve and means securing said blade and bearing members within said hub.

5. A propeller blade mounting for variable pitch propellers comprising a hub having recesses therein adapted to rotatably receive propeller blades therein, propeller blades rotatably mounted within said recesses, an end bearing member surrounding the inner ends of each of said blades, each of said end bearing members being formed in two pieces and means securing the same to said blades independent of the hub, a split sleeve surrounding each of said blades and being split diametrically, and means securing said split sleeve to said blades independent of the hub.

6. A propeller blade mounting for variable pitch propellers comprising a hub having a recess therein, a propeller blade rotatably mounted in said recess, and an end bearing member surrounding the butt end of said blade, said end bearing member being formed in two pieces and means surrounding said end bearing member and securing the same to the blade independent of said hub, a worm journaled in said hub and a gear formed on said end bearing member and meshing with said worm.

7. In a propeller blade mounting for variable pitch propellers, the combination of a hub having a recess therein adapted to receive the end of a propeller blade, a diametrically split end bearing member surrounding the inner end of said blade, means securing said end bearing member to said blade independent of said hub, a split sleeve surrounding said blade and bearing rings holding said split sleeve in place.

8. In a propeller blade mounting for variable pitch propellers, the combination of a hub having a recess therein adapted to receive the end of a propeller blade, a diametrically split end bearing member surrounding the inner end of said blade, means securing said end bearing member to said blade independent of said hub, a split sleeve surrounding said blade and bearing rings holding said split sleeve in place, means detachably secured to said split sleeve and extending between the lowermost of said bearing members and said end bearing member and engaged thereby.

9. In a propeller blade mounting for variable pitch propellers, the combination of a hub having a recess therein adapted to receive the end of a propeller blade, a diametrically split end bearing member surrounding the inner end of said blade, means securing said end bearing member to said blade independent of said hub, a split sleeve surrounding said blade, inner and outer bearing rings surrounding said split sleeve and a ring member disposed between said inner and outer bearing rings and holding the same in spaced relation.

HOWARD C. MEON.